United States Patent [19]
Carlo et al.

[11] Patent Number: 5,184,023
[45] Date of Patent: * Feb. 2, 1993

[54] SELF-CONTAINED ANTI-THEFT DEVICE FOR MOTOR VEHICLES

[75] Inventors: Louis D. Carlo, Cleveland; Joey B. Adkins, Northfield, both of Ohio

[73] Assignee: James E. Winner, Sharon, Pa.

[ * ] Notice: The portion of the term of this patent subsequent to Sep. 18, 2007 has been disclaimed.

[21] Appl. No.: 813,596

[22] Filed: Dec. 26, 1991

Related U.S. Application Data

[60] Continuation of Ser. No. 572,684, Aug. 27, 1990, Pat. No. 5,132,551, which is a division of Ser. No. 564,702, Dec. 23, 1983, Pat. No. 4,958,084.

[51] Int. Cl.$^5$ .............................................. B60R 25/04
[52] U.S. Cl. .................................................. 307/10.3
[58] Field of Search ................... 307/9.1–10.8, 307/131; 361/171, 172, 187, 87, 93; 340/426–430, 825.31, 825.32, 825.34; 180/287, 289; 123/198 B

[56] References Cited

U.S. PATENT DOCUMENTS

| | | |
|---|---|---|
| 1,654,450 | 12/1927 | Blake . |
| 1,968,726 | 7/1934 | Vick et al. . |
| 2,515,819 | 7/1950 | Bourne . |
| 2,768,311 | 10/1956 | Durnin . |
| 3,274,477 | 9/1966 | Boyes .................... 320/35 |
| 3,294,987 | 12/1966 | Skrbina .................. 307/97 |
| 3,430,058 | 2/1969 | Yoshida ................ 307/10.1 |
| 3,459,954 | 8/1969 | Sgorbani . |
| 3,535,899 | 10/1970 | Gardner et al. . |
| 3,553,641 | 1/1971 | Moragne ................. 340/64 |
| 3,585,584 | 6/1971 | Behrend ................. 340/64 |
| 3,634,724 | 1/1972 | Vest .................... 315/209 |
| 3,692,965 | 9/1972 | Gardner .................. 200/44 |
| 3,723,967 | 3/1973 | Atkins et al. ............ 340/426 |
| 3,740,713 | 6/1973 | Teich .................... 340/64 |
| 3,784,839 | 1/1974 | Webber ................ 307/10.2 |
| 3,812,403 | 5/1974 | Gartner .................. 307/10 |
| 3,821,501 | 6/1974 | Parmenter ............. 200/155 R |
| 3,885,164 | 5/1975 | Vest ...................... 307/10 |
| 3,930,226 | 12/1975 | Plumberg ................ 340/64 |
| 4,023,138 | 5/1977 | Ballin .................. 180/287 |
| 4,037,194 | 7/1977 | Boyden et al. .......... 340/428 |
| 4,102,164 | 7/1978 | Barbush ................. 70/241 |
| 4,110,734 | 8/1978 | Lepore et al. ........... 340/64 |
| 4,141,332 | 2/1979 | Wyler ................... 123/148 |
| 4,157,479 | 6/1979 | Chan ..................... 307/10 |
| 4,176,284 | 11/1979 | Higgs .................... 307/10 |
| 4,207,850 | 6/1980 | Wharton ............... 123/146.5 |
| 4,209,709 | 6/1980 | Betton ................... 307/10 |
| 4,218,717 | 8/1980 | Shuster .................. 361/79 |
| 4,236,594 | 12/1980 | Ramsperger ............ 180/167 |
| 4,278,963 | 7/1981 | Allen .................... 340/64 |
| 4,300,236 | 10/1981 | Gilmour .............. 340/825.63 |
| 4,302,747 | 11/1981 | Belmuth ................. 340/64 |
| 4,315,160 | 1/1982 | Levine ................... 307/10 |
| 4,317,108 | 2/1982 | Schwartz et al. ......... 340/64 |
| 4,323,878 | 4/1982 | Luzynski ................ 340/63 |
| 4,327,353 | 4/1982 | Beard et al. ............ 340/64 |
| 4,342,024 | 7/1982 | Rossi .................... 340/64 |
| 4,366,466 | 12/1982 | Lutz ..................... 340/64 |
| 4,431,713 | 2/1984 | Fehling et al. ............ 429/7 |
| 4,438,426 | 3/1984 | Adkins ................... 340/64 |
| 4,463,340 | 7/1984 | Adkins et al. .......... 180/287 |
| 4,553,127 | 11/1985 | Issa .................... 340/428 |
| 4,958,084 | 9/1990 | Carlo et al. ........... 307/10.2 |

FOREIGN PATENT DOCUMENTS

| | | |
|---|---|---|
| 0010084 | 4/1980 | European Pat. Off. . |
| 2079837 | 1/1982 | United Kingdom . |
| 2087969 | 6/1982 | United Kingdom . |

OTHER PUBLICATIONS

"Step Inside See What's Developed", Lectrolabs, Inc., Macedonia, Ohio 44056, Copyright 1983.

Primary Examiner—A. D. Pellinen
Assistant Examiner—David Osborn
Attorney, Agent, or Firm—Body, Vickers & Daniels

[57] ABSTRACT

An anti-theft device that is adapted to be connected adjacent to or on a battery of a motor vehicle and including a power switch for disconnecting the battery from its standard battery cable when current flowing through the cable exceeds a preselected substantial amount of current associated with an attempt to start the vehicle. A lockout circuit is actuated by a remote transmitter for generating an external command signal to override the operation of the power switch. This device can be attached directly to a battery without external wiring and still provide the passive or self-arming anti-theft device.

2 Claims, 7 Drawing Sheets

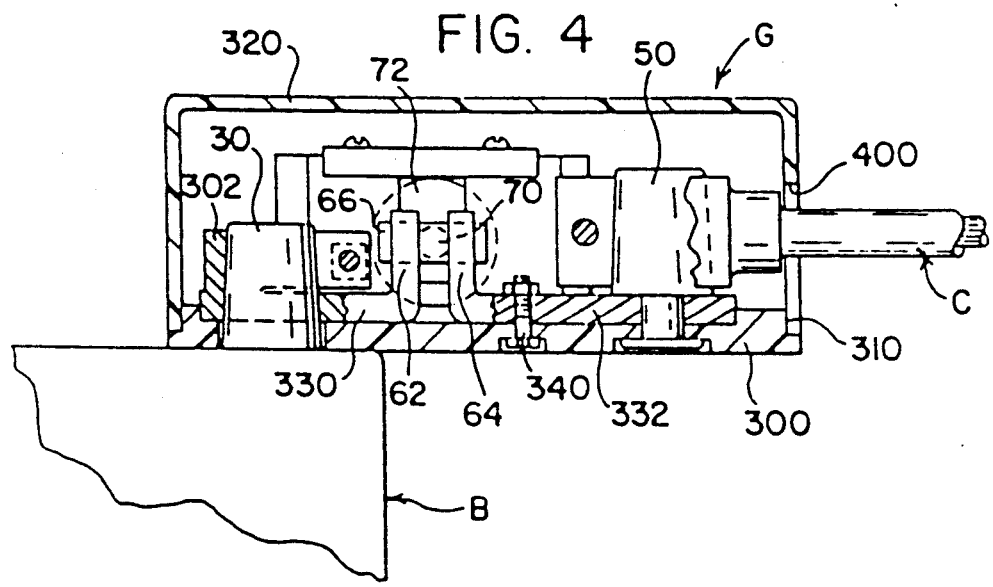
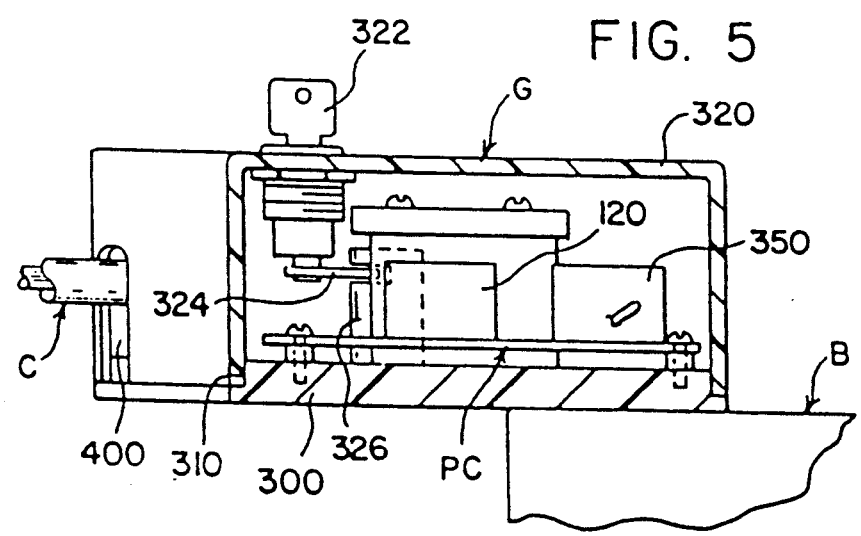

SELF-CONTAINED ANTI-THEFT DEVICE FOR MOTOR VEHICLES

This is a continuation of application Ser. No. 572,684 filed Aug. 27, 1990, now U.S. Pat. No. 5,132,551 dated Jul. 21, 1992, which in turn is a divisional application of Ser. No. 564,702 filed Dec. 23, 1983 (Now U.S. Pat. No. 4,958,084 dated Sep. 18, 1990).

The present invention relates to the art of anti-theft devices for motor vehicle and, more particularly, to a self-contained anti-theft device which can be attached directly to the standard battery of a motor vehicle.

BACKGROUND OF INVENTION

Major factors contributing to the overall cost of operating a motor vehicle are the insurance premiums and inconveniences associated with a theft of the vehicle. To solve these problems, a substantial industry has been developed to manufacture and promote various mechanisms for hindering the ease by which an automobile or other motor vehicle can be stolen. These devices include steering wheel locks, alarm systems, and devices which disable certain essential components of the vehicle when a theft is attempted. These last-mentioned devices can be provided with alarms either using the horn and/or lights of the vehicle or using a separate alarm. Many of these devices include hidden actuating switches or key operated switches for the purpose of selectively arming or disarming the device. Most of these devices are assembled onto a vehicle after it leaves the manufacturing plant. Thus, professional retailers sell anti-theft devices and install them for a substantial labor charge. Such after market installation involves a separate wiring and knowledge of the particular vehicle on which the device is being mounted. These devices are expensive and are too complex for the general public to assemble easily. For this reason, many vehicles do not have anti-theft devices. This is a factor in the increased insurance premiums charged to the general public.

There is a substantial need for an anti-theft device which can be assembled onto the vehicle by an untrained person in a very short period of time without the necessity of mutilating various aspects of the motor vehicle for the purposes of interjecting and installing the device. A device which can be installed by the general public and is passive in operation is now demanded for the purposes of reducing or controlling insurance premiums by a wider use of anti-theft devices on more vehicles.

PRIOR ART

A substantial number of anti-theft devices have been used over the years and even more devices are disclosed in prior art patents, wherein each device is directed toward a particular technique of preventing theft, alarming the public, disabling the vehicle or improvements in these and other concepts. One patent is Luzynski U.S. Pat. No. 4,323,878 wherein the device includes a relay for actuating a siren or other alarm. This type of unit includes a timing circuit for controlling the length of time the alarm is operated. A capacitor is charged for approximately ten seconds for automatically arming the relay for subsequent detection. When lights are turned on or other current demanding conditions exist indicative of unlawful entry, the charge capacitor is discharged to actuate a gating circuit for energizing the relay. This action closes the switches and actuates the siren. The Luzynski patent illustrates a current sensing circuit, which may employ a circuit for detecting a drop in battery voltage, for energizing a hard wired relay through a relay coil. However, there is no arrangement in this patent for deenergizing the battery circuit itself and this prior art device would not be operative in that situation.

In Sgorbani U.S. Pat. No. 3,459,954, there is illustrated a vehicle monitoring system wherein temperature, oil pressure or a remote radio signal can disconnect the battery circuit. As will be apparent, an aspect of the present invention is the use of a coded signal for deactivating the circuit at the battery itself. This prior art is mentioned because of its general relationship to this feature. Another system for employing a coded communication with a vehicle mounted device is shown in Ramsperger U.S. Pat. No. 4,236,594. Another device for actuating an alarm to control the ignition of a vehicle is illustrated in Teich U.S. Pat. No. 3,740,713, wherein the voltage of the battery is used for sensing the current flow as used in the preferred embodiment of the present invention. A relay actuates an alarm; however, the current sensing arrangement is not employed for the particular vehicle theft prevention concept employed by the present invention.

The present invention relates to a concept of controlling the actual starting of the vehicle in a novel fashion. Other features present several novel combinations for the invention. Many systems have been employed in the marketplace to interrupt a part of the ignition circuit for the purpose of preventing, either immediately or after a time delay, the actual starting of the vehicle. These systems have many disadvantages which are overcome by the present invention. In these prior systems, a portion of the ignition circuitry or functioning components must be disabled for installation of the anti-theft device. For instance, the solenoid wire may be cut and employed for preventing starting. This type of an arrangement requires a highly trained person and complex external wiring from the anti-theft device. In some instances, the ground lead to the starter, the ignition line from the ignition switch or the fuel line is cut and provided with monitoring elements for interrupting its function during an attempt by an unauthorized person to operate the vehicle. Such systems are illustrated in Webber U.S. Pat. No. 3,784,839 and Allen U.S. Pat. No. 4,278,963. These patents are offered as illustrative of the prior art. As can be seen, they are all complex devices, are difficult to install and are expensive.

Since the present invention relates to a relay which disconnects the battery cable at the battery itself, it should be appreciated that such a concept has been known for some time. Some patents illustrating the interruption of the battery circuit at the battery are: Blake U.S. Pat. No. 1,654,450; Vick U.S. Pat. No. 1,968,726; Bourne U.S. Pat. No. 2,515,819; Durnin U.S. Pat. No. 2,768,311; Gardner U.S. Pat. No. 3,535,899; Gardner U.S. Pat. No. 3,692,965; and, Parmenter U.S. Pat. No. 3,821,501.

Another prior art patent of interest in Shuster U.S. Pat. No. 4,218,717 which illustrates certain monitoring circuit components which can be employed in the present invention, such as a voltage detector for detecting operation of the generator or alternator 12, current threshold device 22, timer 26 and related commercially available components which do not form a part of the present invention although they may be used as components of a preferred embodiment of the invention.

THE INVENTION

The invention relates to a unique self-contained anti-theft device which overcomes the disadvantages of existing devices and those illustrated and taught in the many prior art patents, the ones mentioned above being illustrative thereof.

In accordance with the present invention, there is provided a self-contained, anti-theft device connected adjacent to, preferably on, a battery of a motor vehicle having a starting circuit including an operating or ignition switch and a starting motor adapted to draw a substantial amount of current from the battery when the operating or ignition switch is actuated. The anti-theft device comprises a power switch having a first condition connecting the battery to the starting circuit and a second condition disconnecting the starting circuit from the battery. Means are provided for shifting the power switch into the second, disconnect condition, on responce to flow of a substantial amount of current indicative of an attempt to start the vehicle, means for disabling the shifting arrangement for a predetermined time upon receipt of an external coded command signal having a given frequency and a signal receiving means mounted on the anti-theft device for receiving and acknowledging a properly coded command signal from an external source, such as a hand-held transmitter. By using this concept, the power switch opens as soon as there is an attempt to start the engine. Thus, the engine cannot be started as long as the shifting arrangement is not deactivated or overriden. In this manner, an unauthorized person can not start the engine of the vehicle onto which the present invention is attached or mounted. In the preferred embodiment, the disconnect is held open for a very short time, such as one second. An unauthorized person thus believes that the vehicle has a low battery and discontinues the attempted theft. This device protects against jumping the ignition switch, a common technique used in vehicle thefts. The starting circuit is opened for a selected time, then the power switch closes. This causes a chatter which prevents actual vehicle ignition by preventing engine cranking.

An authorized operator has a hand-held transmitter which deactivates the shifting arrangement in the anti-theft device. Upon receipt of a properly coded command signal, the power switch will remain in its normal operating condition for a preselected time necessary for a person to enter the vehicle and start the engine. After this time, the override feature accomplished by the transmitter will be discontinued. Thus, the vehicle is operating while being monitored by the anti-theft device. Current flow through the anti-theft device is allowed when the power switch is in its first or closed condition because the current being used for operating the vehicle and any electrical component thereof is not sufficient to cause the shifting means to shift the power switch into the opened position. This novel device operates in response to a substantial magnitude of current flow from the battery. This is a distinct difference from the lower, or normal, magnitude of current flow necessary to operate normal electrical components. This flow will be a maximum in the neighborhood of approximately 50-100 amps. When the operator stops the vehicle and leaves, no-one can start the car without coded transmission. Thus, the device is self-arming or passive in operation. This is somewhat critical from the insurance premium standpoint and it also assures that the vehicle is protected at all times.

In accordance with another aspect of the invention, there is a stall detector employed in the device wherein the override mechanism which is generally actuated by a remote command signal is actuated by the discontinuation of the operation of the engine This can be detected by sensing a decreased voltage across the battery as the generator or alternator stops operation. Thus, if the automobile stalls the operator has a preselected time to restart the engine. If this is not done within the preselected time, the anti-theft device is armed and can be operated only by a transmitted, coded, command signal. In accordance with another feature of the invention, there may be a key operated switch or magnetic operated switch that disarms the anti-theft device. This device can be employed when the vehicle is loaned to another person or when it is being parked by a valet or parking lot attendant. In those situations, other persons need not know that the automobile is protected by an anti-theft device.

In accordance with other aspects of the present invention, the antenna for the receiving device is the automobile metal body and it is tuned to the proper frequency by a coil etched in the printed circuit board of the preferred embodiment of the invention. This concept allows receipt of the proper frequency signal for operating the decoding circuit of the anti-theft device from relatively long distances, such as twenty or thirty feet, without the need for an extended antenna.

In accordance with still another aspect of the invention, the inventive self-contained, anti-theft device is constructed to mount directly over the existing posts or terminals of an automobile battery. In view of the techniques employed in the present invention, the device can be merely mounted onto the posts and the two battery cables can then be affixed to substitute posts on the anti-theft device for complete installation. As can be seen, anyone knowing how to disconnect battery cables from the automobile battery can install the anti-theft device of the present invention. This is a substantial advantage. No further wiring is needed. No special skill or training is required. If this particular device is to be employed during the manufacture of the vehicle, it can be inserted physically into the battery employed on the vehicle. In this fashion, the self-contained device is within the battery and not exposed externally of the battery. By employing the simple anti-theft device of the present invention, both an O.E.M. unit or an after market unit is possible. This extreme versatility, together with the simplicity and lower cost of this particular type of anti-theft device, overcomes many of the disadvantages experienced in prior protective devices. Of course, if a key is to be employed for deactivating the novel device during use by other people, the key receptacle can be contained on the device itself and adjacent the battery. There would be no need for external wires in the system. An optional arrangement can be employed wherein a wire extends from the device and contains a key operated or magnet operated switch which may be hidden or concealed at various locations on the automobile. Even this optional structure does not require any interruption of the normal electrical components of the vehicle. It is also possible to mount a siren or other alarm on the anti-theft device itself. Such an alarm could be actuated after opening of the power switch. This feature is not described in the present invention since it would involve only a relatively simple circuit to connect with the power switch in the self-contained unit mounted on or in the battery. Again, if the siren or alarm is mounted on the device itself, no external wiring is required. In all of these instances, an untrained person can disconnect the battery cables and mount the present unit onto the existing battery posts. The disconnected battery cables can then be connected onto the posts of anti-theft device. It is possible to mount the anti-theft device only on the positive terminal or post of the battery. In that instance, only one battery cable would have to be disconnected and reconnected onto the anti-theft device after it is secured over the positive post of the battery. In the preferred embodiment of the invention, both posts are employed for mounting the anti-theft device to produce positional stability and to provide more structural support for the anti-theft device when it is attached directly to the battery. Of course, the geometry of the device may require certain modifications to be used by top posts of a battery or side posts of the battery. All of these modifications would be well within the ordinary skill of the art.

The primary object of the present invention is the provision of a self-contained, anti-theft device, which device is easy to install, reliable in operation, and requires no rewiring or modification of existing electrical wires or fuel conduits.

Another object of the present invention is the provision of a self-contained, anti-theft device, of the type mentioned above, which device can be mounted on or in a standard battery of a motor vehicle.

Still a further object of the present invention is the provision of an anti-theft device, as defined above, which device allows operation of the vehicle under normal running conditions, but prevents unauthorized starting of the vehicle.

Another object of the present invention is the provision of an anti-theft device, which device includes a disconnect, power switch on the battery itself. This switch is, in the preferred embodiment, a single pole single throw switch so that there is either a complete disconnection of battery cable or a complete connection.

Yet a further object of the present invention is the provision of a device, as defined above, which device requires no external wiring and requires no interruption of existing equipment. In addition, the device employs an external transmitter for deactivating the device for a time necessary to enter the vehicle and start the engine.

Another object of the present invention is the provision of a device, as defined above, which device can be used as O.E.M. equipment or after-market equipment since it requires no complex external wiring. It could be used by a battery manufacturer as an optional type of battery. The external wires, if any, are only wires necessary for disarming or an external alarm, even though the alarm and disarming switch could be mounted directly in the device at or in the battery.

These and other objects and advantages will become apparent from the following description taken together with the accompanying drawings.

BRIEF DESCRIPTION OF THE DRAWINGS

FIG. 4 is a side view of the preferred embodiment as shown in FIG. 3;

FIG. 5 is a further side view of the preferred embodiment illustrated in FIG. 3 with the cover locked in place over the anti-theft device after it has been mounted on the battery and connected to the standard battery cables of a motor vehicle;

PREFERRED EMBODIMENT

Figure 1:
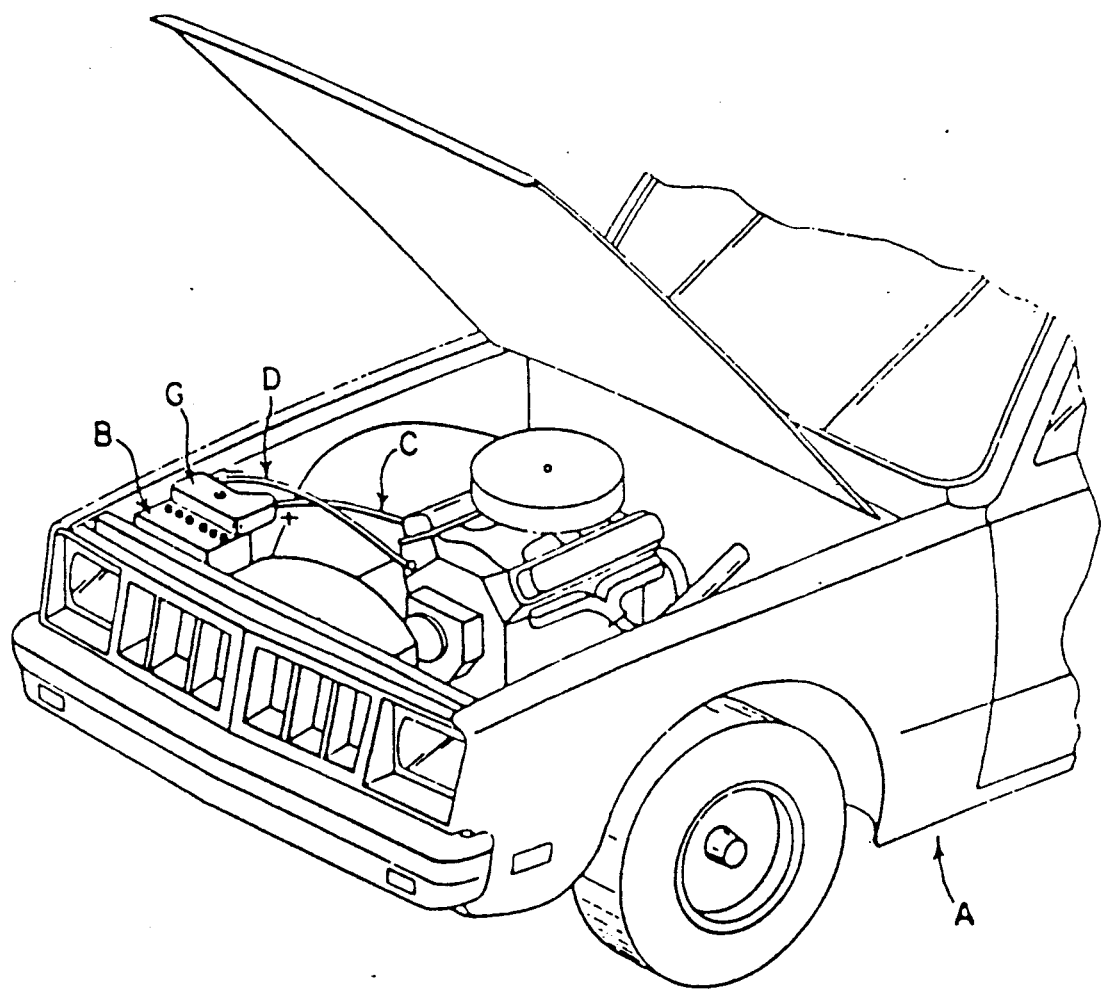
FIG. 1 is a partial, pictorial view illustrating the preferred embodiment of the invention as mounted on the battery of a motor vehicle.
Figure 2:
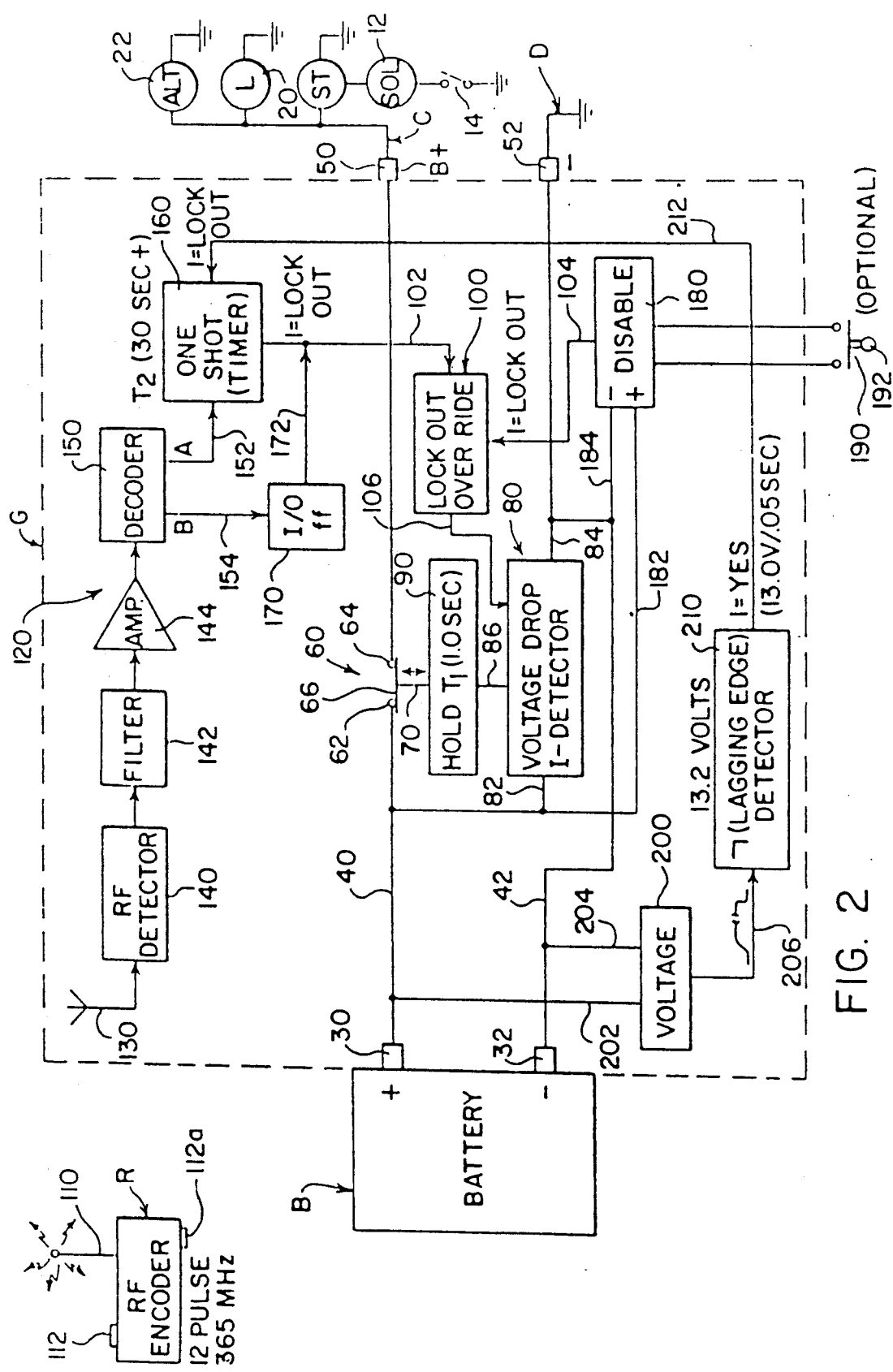
FIG. 2 is a block diagram showing the preferred embodiment of the present invention.

Referring now to the drawings wherein the showings are for the purpose of illustrating a preferred embodiment of the invention only, and not for the purpose of limiting same, FIGS. 1-5 show a motor vehicle, such as automobile A, having a standard battery B of the type directing electric current through battery cables C, D. In this illustration, cable C is the positive cable for the battery, whereas cable D is the grounded, or negative, battery cable. A self-contained anti-theft device constructed in accordance with the present invention is illustrated as device G and is operated by a remote hand-held transmitter R, as shown in FIG. 2. Self-contained anti-theft device G is connected directly onto battery B, in the preferred embodiment, and has attached thereto standard battery cables C, D. Vehicle A has a standard starting circuit including a starter 10, a solenoid 12 and an ignition switch 14. When the ignition switch is closed, solenoid 12 engages the starter with the flywheel and causes a current flow from the battery through the starter. This current flow is quite high and exceeds about 200-300 Amps, which is defined in the illustrated embodiment of the invention as a starting mode of operation. In this first mode of operation, a substantial drain is applied to the battery B; therefore, a substantial voltage drop occurs across terminals 30, 32 of battery B. During normal operation, the current provided by battery B drives various electrical components schematically illustrated as lights 20 in FIG. 2. Of course, current drain is also employed for the ignition system, radios, fans, power equipment and other normally used components in a motor vehicle. During the normal or quiescent mode of operation, the current flow from battery B is substantially less than the current flow during the starting mode.

This is a difference in kind with respect to the operation of the battery wherein a large current of 200 Amps or more is used during the starting mode, ampers less than about 100 are drawn from the battery during the quiescent mode. The level of current flow is detectable by the voltage across the terminals of the battery B. As is well known, the voltage potential across the battery has a distinct lower value during starting of the vehicle. This distinct lower value is employed in accordance with the present invention, to measure when the automobile A is being operated in the starting mode as opposed to the normal, quiescent mode. While the engine is running, a generator or alternator 22, shown in FIG. 2, applies current to battery B for the purposes of charging. This charging circuit normally includes a voltage regulator; however, there is a sufficient increase in the voltage as measured across leads 30, 32 to determine when the alternator is functioning to indicate that the engine is running. These standard operating features or parameters in an automobile vehicle electrical system are employed in the preferred embodiment of the self-contained anti-theft device G which is attached directly to battery B, as best shown in FIG. 1 and as illustrated in FIGS. 2-5.

Figure 3:
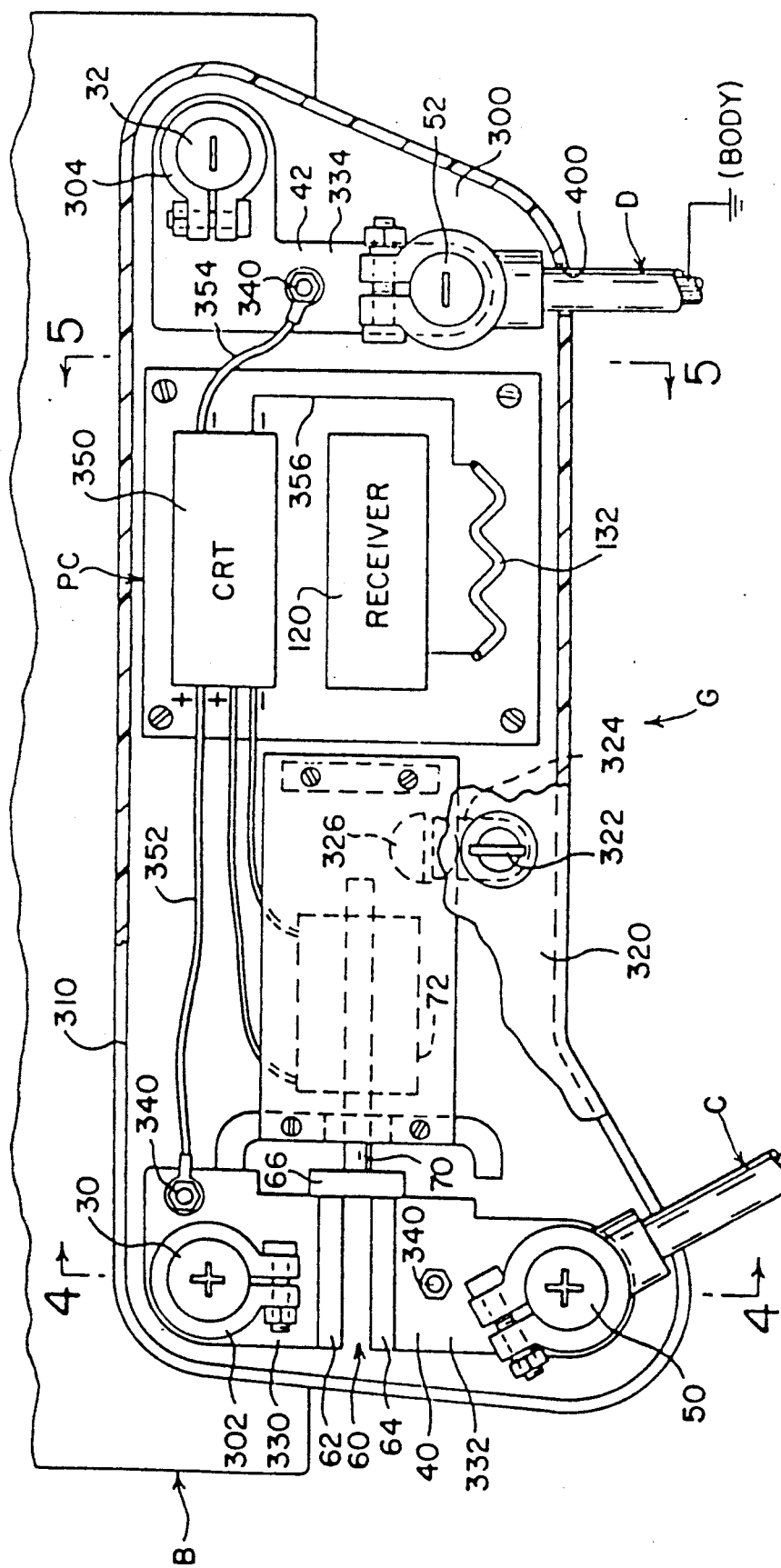
FIG. 3 is a partial plan view of the preferred embodiment of the present invention as attached to the existing posts of a battery and with the upper cover removed.

Referring now to FIG. 2, as previously mentioned battery B has two standard posts or terminals 30, 32 which are connected to the conductors, straps or lines 40, 42 contained within the anti-theft device G, the outer periphery of which is set forth by the dashed lines. Device G includes two substitute posts or terminals 50, 52 connected to the lines 40, 42, respectively, for the purpose of attachment of the standard battery cables C, D, respectively. Conductor 40 can be interrupted within device G by a power switch 60 having two poles or contacts 62, 64 adapted to be shunted by a jumper bar 66, the movement of which is controlled by rod 70 of solenoid 72, as best shown in FIG. 3. As can be seen, when bar 66 is closed, conductor 40 connects standard terminal 30 with substitute terminal 50. Line 42 is not interrupted and is employed for the purpose of connecting standard posts or terminal 32 with a substitute post 52. The use of both posts 30, 32 for the purposes of mounting device G onto battery B provides better positional control and stability. It is appreciated that conductor or line 42 could be omitted and cable D could be connected directly to the original post 32 of battery B without departing from the intended spirit and scope of the invention. By employing conductor 42 in device G, a direct connection within device G can be made with the grounded portion of the electrical system for vehicle A. For that reason, conductor 42 is employed in the preferred embodiment of the invention and is used for making that electrical connection as required by the electrical circuits within device G.

An operating device or circuit 80 is employed for actuating solenoid 72 to pull rod 70 away from poles 62, 64 for the purposes of opening the positive side of battery B by interrupting conductor or line 40. Any type of operating circuit may be employed for this purpose; however, in the preferred embodiment, operating circuit 80 monitors the battery voltage across lines 40, 42 by control lines 82, 84. As previously mentioned, the reduction in voltage across the battery, as monitored by operating circuit 80, measures current flow by the drop in voltage. There are other ways to measure current flow; however, voltage drop appears to be the most convenient and the most widely used. Operating circuit 80 is a threshold detector which measures the difference in the operating modes of the electrical circuit for automobile A. When the voltage drop is sufficient to indicate that the starting mode is being requested by the operator, the current flow exceeds the high starting current in the neighborhood of 200-300 ampers or more and actuates the output 86 of circuit 80. This output is directed to a hold device 90 for the purpose of holding solenoid 72 actuated for a relatively short time, T1. This time T1, in practice is 1.0 seconds, so that the current flow during the starting mode can not ever exist, except momentarily, unless either the detector or operating circuit 80 or delay circuit 90 is overriden or locked out. As so far described, detector circuit 80 detects high current by measuring the voltage drop across lines 40, 42. When a given current is exceeded, a signal is directed through line 86 for the actuation of solenoid 72. This actuation is held for a slight time (1.0-2.0 secs.) Momentary high currents in the normal operation of the vehicle will operate solenoid 72 for the purpose of interrupting the current flow through line 40. If all the electrical devices are on, such as lights, radio, power devices, fans, etc., current will flow from battery B. This current is substantially less than the current flow in the starting mode. If an unauthorized person attempts to start the car by jumping switch 14, or by any other means, detector circuit 80 is actuated. This actuates solenoid 72 so that jumper bar 66 is pulled from contacts 62, 64. As soon as that happens, detector or control device 80 senses no current flow. The voltage of the battery builds up again. This allows switch 60 to be closed after T1 by moving jumper bar 66 into the position shown in FIGS. 2 and 3. As can be seen, an unauthorized person can not drive the vehicle. Indeed, there is not way to determine accurately the starting difficulty. This fact deters theft of the vehicle. Time is of essence in the common automobile theft situation. If the thief finds that bypassing switch 14 will not allow operation of the vehicle, the attempted theft will normally be abandoned. This is the normal theory with respect to complex antitheft devices now being employed which disrupt the drivability of the vehicle in some fashion, such as disconnecting the solenoid 72, disconnecting the ignition system or interrupting the fuel pump. The present device G accomplishes this same laudatory and proven concept in theft prevention without the necessity of the complex installation wiring and disruption of normal automobile or vehicle components.

LOCKOUT FEATURE

As so far described, the vehicle can not be operated unless power switch 60 remains closed for a sufficient length of time to start the vehicle. For a very simple embodiment of a theft prevention device using one aspect of the inventive concept, a key switch on the self-contained, anti-theft device G could be used for locking switch 60 closed. In accordance with the preferred embodiment of the present invention, there is provided a lockout or override circuit 100 adapted to be operated by a hand-held transmitter R. To provide the basic protection of device G, lockout device 100 is operated by pushing button 112 of transmitter R for the purposes of directing a 12 pulse coded signal having a 365 MHz carrier. Lockout device or circuit 100 has inputs 102 and 104. When either of these inputs is at a logic 1, or high voltage, output 106 assumes a logic 1, or high voltage, to override the detector device 80. Also, lockout 100 could control solenoid holding circuit 90, as shown in FIG. 2. Any one of these types of operation could be employed for locking out the operation of solenoid 72 to prevent power switch 60 from opening when a voltage drop indicative of a high current is sensed by circuit or detector 80. The lockout device can have a variety of structures and can be a standard electrical one shot circuit or an analog detector circuit. A logic 1 in this description indicates a signal above a certain level, or the existence of a signal in an analog environment. The use of the digital concept is better adapted for explaining the operating characteristic of the circuit within device G.

Antenna 110 of remote hand-held encoder R creates a coded demand signal upon depression of button 112. Antenna 110 activates receiver stage 120 of the self-contained device G. An internal antenna 130 includes the automobile body which is grounded and also a tuning coil 132 which is etched in a printed circuit board PC, as shown in FIG. 3. This tuning portion or coil 132 is an undulated, etched conductor on the printed circuit board and is employed for the purpose of tuning antenna 130 which includes the body of vehicle A for receipt of a signal having a frequency of 365 MHz. Receiving stage 120 can use a variety of concepts; however, the preferred embodiment employs a detector circuit 140 to pass a signal from antenna 130 having a general frequency of 365 MHz. Filter 142 is a discriminating stage and passes only the carrier frequency to a standard analog amplifier 144. This amplifier loads, in a serial fashion, the coded command signal into a signal decoder 150 which produces a signal at output A when the decoder detects the preselected code for the incoming signal. This produces a logic 1 in line 152 for toggling one shot device 160 having an internal timing circuit for retaining a logic 1 on line 102 for a preselected time. This can be adjusted between 20-30 seconds and more. Time T2 must provide sufficient time for the authorized person to enter the vehicle and start the engine. Of course, if this time is exceeded, button 112 can be depressed again to produce another time, T2. When one shot 160 has toggled to hold a logic 1 at line 102, lockout device 100 disables the solenoid 72 through either hold circuit 90 or current detector circuit 80. Consequently, for the time T2, power switch 60 will be held in the closed condition irrespective of the current flow. This allows starting of vehicle A.

An authorized person has a hand-held encoder or transmitter R. To start the vehicle, button 112 is depressed much like a garage door operator. This allows a certain amount of time to start the engine of vehicle A. An additional time T2 can be provided by again depressing button 112. After one shot device 160 times out, the lockout circuit or override circuit 100 is deactivated to release solenoid 72 for operation by detector 80. Since operation of a vehicle does not drain sufficient current to activate device or detector circuit 80, switch 60 remains closed during normal operation of the vehicle, the quiescent mode. If the vehicle is to be left with a parking lot attendant or loaned, there are two separate arrangements for disabling the protection system. These are optional features for the device G. Transmitter R can be provided with a second button 112a. This generates a different signal having the same number of pulses and same carrier frequency. When this signal is received by decoder 150, it actuates the output B or line 154. This toggles a flip-flop or other circuit 170 to create a logic 1 in the output 172. This logic 1 is held at the input 102 of override device 100 until another pulse or signal is received from output 154. The second depression of button 112a toggles flip-flop 170 to remove the logic 1 in output 172. Then the vehicle protection device G operates as previously described. The second system for disabling device G also controls the operation of the lockout or override circuit or device 100. The disabling circuit 180 is connected across lines 40, 42 by conductors 182, 184. An external optional switch 190 can be closed by key 192. As mentioned before, this switch can be mounted on device G. In this manner, there will be no external wiring. Optionally, switch 190 can be located at some hidden position for operation by key, such as key 192, or by a magnetic read switch. It is preferred to have key 192 for switch 190 directly mounted on the housing of anti-theft device G. If the device is to be completely disabled for a length of time, the hood is raised and a key inserted for actuating disabling circuit 190. This produces a continuous signal in line 102 for creation of a continuous lockout or override signal in output 106 of circuit 100. This feature, mounted on the housing itself, will be used in the preferred embodiment. The use of a second code signal, such as illustrated with respect to flip-flop 170 can be employed for adding remote selectivity to the disabling feature. As now envisioned, only a switch 190 and a single code will be employed. The second code is illustrated for the purpose of further versatility of the basic concepts of the present invention. As can be seen, by pushing button 112a, switch 60 remains closed. A second signal to flip-flop or circuit 170 arms the anti-theft device G for subsequent operation. In a like manner, the switch 190 can be closed to deactivate device G. These and other modifications in the basic concept of the preferred embodiment of the invention can be used.

STALL DETECTOR FEATURE

In some instances, the motor vehicle may stall. This will require operation of the starting circuit. Due to the passive nature of the anti-theft device, whenever the starter is operated, power switch 60 will open. Consequently, the engine can not be started after a stall. Of course, button 112 could be depressed to allow a time T2 to start the engine; however, this could be an inconvenience. In accordance with another aspect of the present invention, a voltage detector device 200 detects the voltage across terminals 30, 32 of battery B by connectors 202, 204, respectively. The output voltage detector 200 is indicated in the wave form above output line 206. During operation of the vehicle, alternator 22 attempts to charge battery B. This will produce a relatively high battery voltage during operation of the engine. When the engine stalls, alternator 22 stops and the output of device 200 drops drastically. A detector 210 is controlled by this voltage level in line 206. This device is a falling edge detector which recognizes a substantial voltage reduction after a voltage increase. When the output voltage drops for a preselected time, in practice, 0.5 seconds, a logic 1 appears in output line 212. This sets one shot device 160 to provide another time T2 for starting of the engine by starting circuit. Thus, whenever the engine stalls, a logic 1 appears in line 212 and the operator has another preselected time for restarting the engine. Various types of detectors could be employed for monitoring the running of the engine. In the preferred embodiment, alternator 22 itself is employed together with an overvoltage meter or transducer 200 to operate a declining voltage detector 210. Of course, if a digital circuit were employed, device 210 could be a toggle circuit wherein a logic 1 is determined to be above 13 volts and a logic 0 is below 13 volts. A time delay device would receive a logic 0 and then toggle a logic 1 into line 212 if the logic 0 were retained for a preselected time, such as 0.5 seconds. In practice, the high voltage caused by charging of battery B through the alternator, is approximately 13.2 volts for battery B. When the voltage drops to approximately 13 volts, one shot device 160 is operated in accordance with any type of circuitry. This is the third arrangement for controlling lockout circuit or override device 100. The device can be operated by a one shot device from either the stall detector or from the coded command signal detector 140. Switch 190 can selectively release device or circuit 100, as can a second coded output from the optional B terminal or decoder 150.

MECHANICAL FEATURES

By employing the simple anti-theft concept so far explained, the device G can be self-contained and mounted directly onto the battery B. This is accomplished by certain mechanical features in the preferred embodiment, best shown in FIGS. 3-5. A support member or plate 300 is formed from a rigid plastic and is mounted directly onto battery B at terminals 30, 32. Clamps or fasteners 302, 304 could be employed. In practice, a bolt is passed through plate 300 and bolts this plate directly to the side terminals of a standard battery. Whichever system is to be employed, the rigid plate 300 is mounted directly onto terminals 30, 32. A stepped shoulder 310 extends around the periphery of plate 300 for receiving a matching plastic cover 320, which is held over the plate 300 by an appropriate arrangement. In practice, a key 322 mounted on cover 320 is adapted to oscillate keeper 324 to provide an interference fit with a lock post 326 fixed onto and made a part of plate 300. Thus, cover 320 can be locked over plate 300 so that the internal structure of self-contained device G can not be accessed, except with a key 322. Large copper straps 330, 332 and 334 form the leads or conductors 40, 42, as shown in FIG. 2. These straps must have a substantial size to carry the high currents employed in operation of the motor vehicle. A plurality of bolts 340 spaced around plate 300 bolt the conductors or straps 330, 332 and 334 into recesses formed in the plate. Such recesses are not illustrated; however, they are provided in accordance with the preferred embodiment for the purposes of lending rigidity and support to the location of the straps and also allowing the straps to reenforce plate 300. The circuits shown in FIG. 2 are permanently attached at discrete components on a printed circuit board PC. These circuits are represented as block 350 in FIG. 3. It is appreciated that digital circuits and LSI chips could be employed for these circuits according to the anticipated volume of production. In the illustrated embodiment of the invention, circuits 350 are discrete components having characteristics and functions as set forth in the description with regard to the embodiment illustrated in FIG. 2. Leads 352, 354 provide constant voltage potential for the circuit 350 and are similar to lines 82, 84, lines 182, 184 and leads 202, 204. The tuning coil or choke 132 for the antenna 130 is connected to the body of the vehicle by a lead 356. The back of board PC has a metal ground plane and the body is the antenna for receiving the coded command signals from hand-held transmitter R. Substitute posts 50, 52 are mounted onto plate 300 at the outer ends of straps 332, 334, respectively. These substitute posts receive standard battery cables C, D for connection of the cables with battery B.

Device G can be easily assembled onto the vehicle A. After raising the hood, battery cables C, D are removed from terminals or posts 30, 32. Thereafter, plate 300 is bolted to terminals 30, 32 or held on by other fastening devices illustrated as straps 302, 304 in FIG. 3. Thereafter, standard cables C, D are attached to substitute posts 50, 52 in accordance with standard practice. This may be by straps or by bolts or screws. Then cover 320 is assembled over plate 300 and locked in place by keeper 324 engaging block posts 326. Appropriate clearance openings 400 allow the cover to be assembled onto the plate without interference with the protruding battery cables. If a switch 190, shown in FIG. 2, is provided, wires will extend from another opening in the cover. These wires will have a predetermined length that will allow this switch to be mounted anywhere in the vehicle. In practice, the switch 190 is mounted in some fashion onto rigid plate 300 so that it will be in an area not covered by plastic cover 220. In this fashion, no external wires are required and a second key or the same key can be used to permanently hold the lockout 100 when the automobile is loaned or turned over to a parking lot attendant or valet. Device G can be installed by an untrained person in a very short time without a substantial mechanical or electrical difficulty. If a manufacturer of the vehicle wishes to provide this type of anti-theft device, it could be inserted into the battery B to interrupt current flow from plate-to-plate within the battery.

Figure 6:
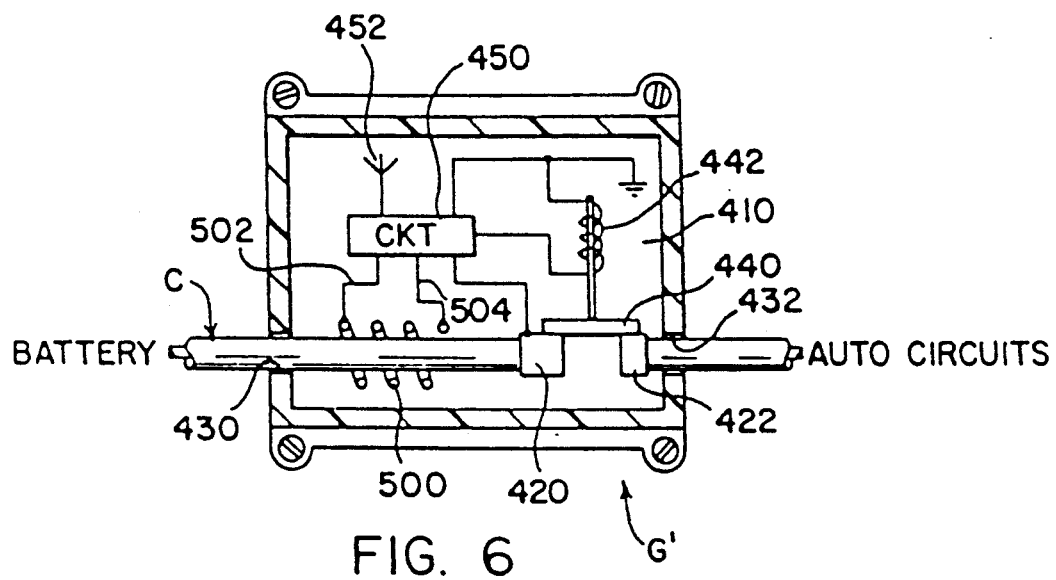
FIG. 6 is a schematic view of a possible modification of the present invention wherein the positive battery cable is interrupted at a location either near or remote from the battery. This arrangement could be mounted on the engine at a location spaced from the battery; however, this is not the preferred arrangement since one advantage of the present invention is the ability to mount the anti-theft device at the battery itself without interruption of an existing cable or conduit. This modification also illustrates the concept that the device could be mounted on the battery and form a connection only between a single terminal of the battery and a battery cable of the vehicle.
Figure 7A:
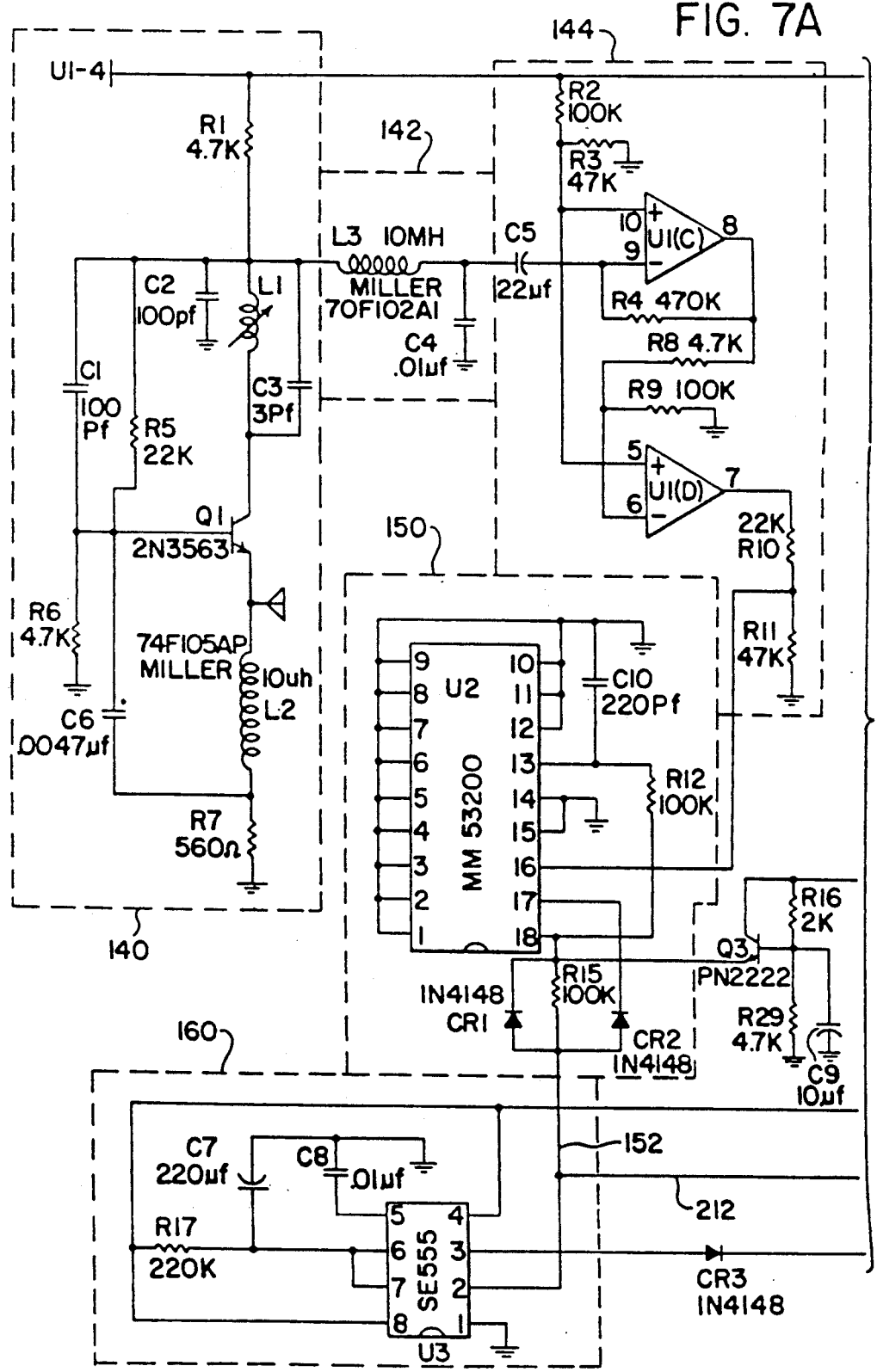
FIGS. 7A and 7B are a schematic wiring diagram of the device shown in FIGS. 2-5 which is for illustrative purposes only and will not be described in detail in the present application.
Figure 7B:
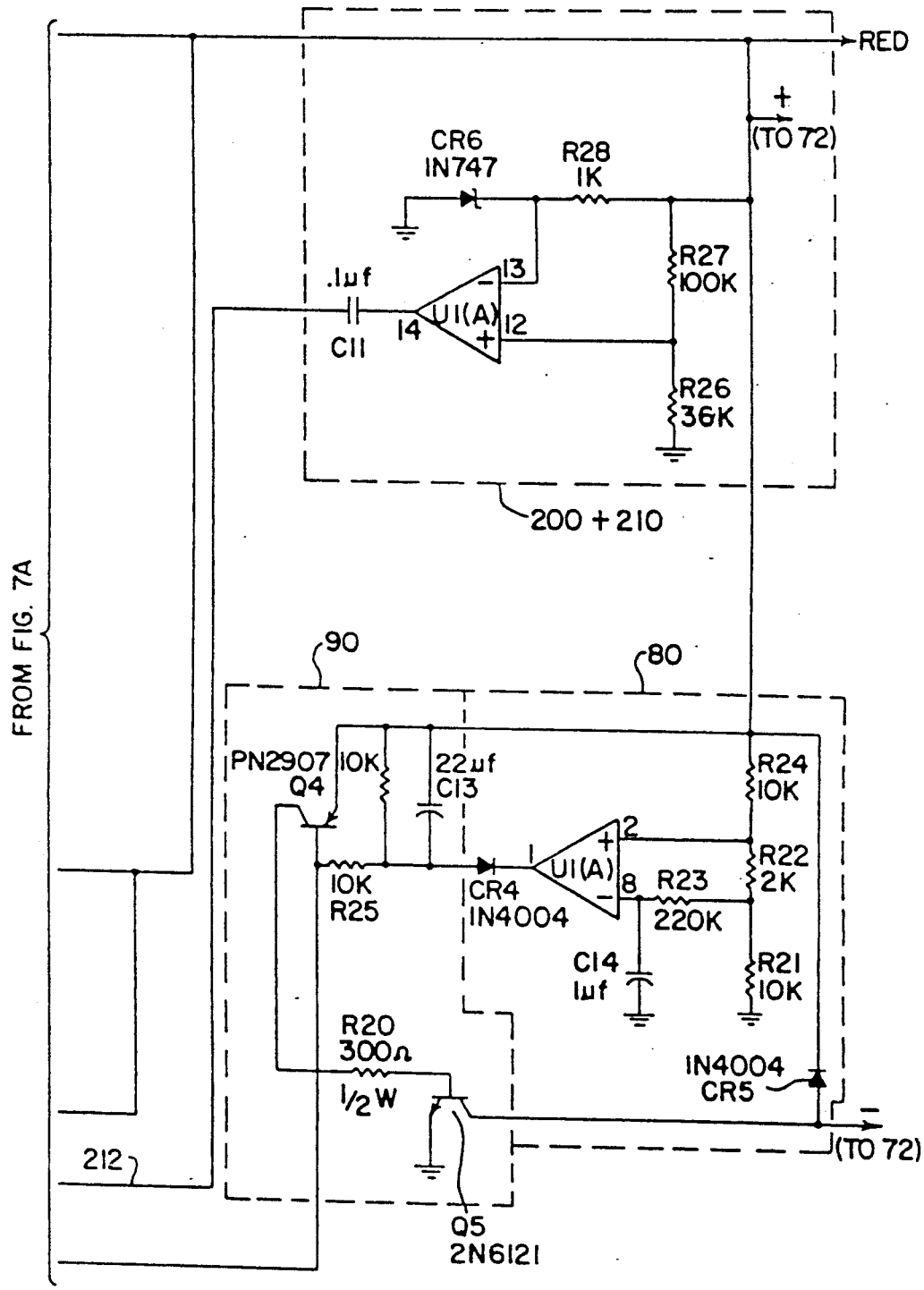

Referring now to FIG. 6, a modification of the preferred embodiment of the device is illustrated. In this modification, an anti-theft device G' includes a base 410 having a cover cutaway. Fixed terminal receptacles 420, 422 are employed for holding the ends of cable C after it has been cut at an intermediate location. Openings 430, 432 provide clearance for the two separate ends of the positive battery cable C. A jumper bar 440 is reciprocated by a relay coil 442 under the control of circuits 450, as previously explained. An antenna 452 receives the coded, radio frequency, command signal for disabling coil 442 for a preselected time T2. One modification of device G' is the measurement of the current in battery cable C by a surrounding inductor coil 500 having leads 502, 504 directed to control circuits 450. In this manner, current flow through the battery cable is detected. If the engine is being started, this sensing coil produces a preselected induced voltage to control circuit 450 so that bar 440 is lifted from terminals 420, 422 unless a lockout condition exists. Another aspect of this modification is a teaching that anti-theft device G' may be mounted over a single terminal or cable of battery B. By employing device G', base 410 may be mounted adjacent the battery or spaced from the battery. In any instance, current flow through one of the battery cables is detected for the purposes of actuating the novel theft prevention concept employed in the present invention.

Any attempt to start the vehicle while one of the self-contained devices G, G' is actuated, will cause a sudden voltage drop at the battery terminals. This parameter is indicative of a high current flow. This condition is detected by a current detector circuit 80 which will trigger delay device 90 to interrupt power to the vehicle. Device 90 will cause a lockout for approximately 1.0 second. Upon release of the lockout by device 90, continued attempts to start the vehicle will immediately retrigger device 90 to open switch 60 after T1. In order to start the vehicle, a properly encoded signal is transmitted to the protection device by a variety of techniques, in practice a radio frequency signal is transmitted from hand-held transmitter R. This produces, in the preferred embodiment, a low powered radio frequency signal to activate a low power radio frequency receiver which employs the automobile chassis itself as the receiving antenna. When the proper coded signal is received by antenna 130, and acknowledged by decoding circuit 150, lockout or override circuit 100 is activated. This will allow full power to be directed from the battery to the starting circuit. This override circuit will remain active for a predetermined, in some instances adjustable, period of time, T2. The normal starting of the vehicle can be accomplished during this preselected time. If the vehicle is not started during this time period, device G, G' will return to its activated or quiescent condition, which will require another encoded signal to allow starting.

After the vehicle has been started, the anti-theft device G, G' detects that the engine is running by monitoring the battery voltage across leads 202, 204. When the battery voltage exceeds approximately 13.2 volts, device 210 determines that the engine has been started. If this voltage falls below approximately 13.0 volts for approximately 0.5 seconds, monitoring circuits 210 determine that the vehicle has been stalled. This will trigger lockout or override circuit 100 by activating one shot device or timer 160 in the same manner as if the one shot or timer were activated by receiving an encoded command signal. This feature allows the engine to be restarted after a stall has occurred without following the procedure of again depressing a button on handheld encoder or transmitter R.

It is possible to have lines 102, 206 control a logic circuit, such as an OR gate, to deactivate a separate alarm circuit when a YES signal is on either of these lines. In this manner, when the motor is turned OFF line 206 is shifted to a logic 0 and a logic 1 is retained in line 102 for time T2. A person can exit the vehicle before line 102 shifts to a logic 0 to arm the alarm system. As long as the engine is running the separate alarm system would be deactivated.

Having thus defined the invention, the following is claimed:

1. An anti-theft device connected or attached to a standard battery of a motor vehicle having normal electrical components and a starting circuit including a starter, said battery providing a low level of current to operate said normal electrical components when said vehicle is operated and a high level of current to operate said starter, said anti-theft device comprising a switching means having a first position electrically connecting one of said battery's electrodes with said starting circuit, and a second position electrically disconnecting one of said battery's electrodes from said starting circuit, detector means for detecting flow of current across said battery's electrodes when greater than a preselected value which is greater than said low level, and means for shifting said switching means to said second position only upon detection of said preselected value of current flow and timing means for deactivating said shifting means for a known time upon receipt of a specific external command signal.

2. The anti-theft device of claim 1 further including means to physically attach said device to at least one of the electrodes of said battery so that external wiring of said device to said battery is alleviated.

* * * * *